United States Patent

[11] 3,566,158

[72] Inventors T. O. Paine
Deputy Administrator of the National Aeronautics and Space Administration in Respect to an Invention of;
Richard J. Ravas, Monroeville, Pa.

[21] Appl. No. 750,787
[22] Filed Aug. 7, 1968
[45] Patented Feb. 23, 1971

[54] TRANSISTOR DRIVE REGULATOR
6 Claims, 1 Drawing Fig.

[52] U.S. Cl. ........................................ 307/253, 307/300
[51] Int. Cl. ........................................ H03k 17/04
[50] Field of Search ........................................ 307/254, 280, 300, 253

[56] References Cited

UNITED STATES PATENTS 2,887,542 5/1959 Blair et al. .................... 307/254X
3,240,954 3/1966 Murphy ........................ 307/280X

OTHER REFERENCES

Norton, " Turnoff Circuit," IBM Technical Disclosure Bulletin, Vol. 7. No. 6, November 1964, page 428 307-300
Steinberg " High-Speed Inverter Circuit," IBM Technical Disclosure Bulletin, Vol. 8, No. 5, October 1965, Page 811 307-300

*Primary Examiner*—John Kominski
*Assistant Examiner*—James B. Mullins
*Attorneys*—N. T. Musial, G. E. Shook and G. T. Mc Coy

ABSTRACT: A drive circuit for a semiconductor switch has a variable conducting means connected between a drive signal source and the switch. The variable conducting means is connected in controlled relationship to the driving source through a voltage dropping means and drive current diverting means bypasses some drive current around the variable conducting means. Means for decreasing the turnoff time of the switch is also provided.

PATENTED FEB 23 1971 3,566,158
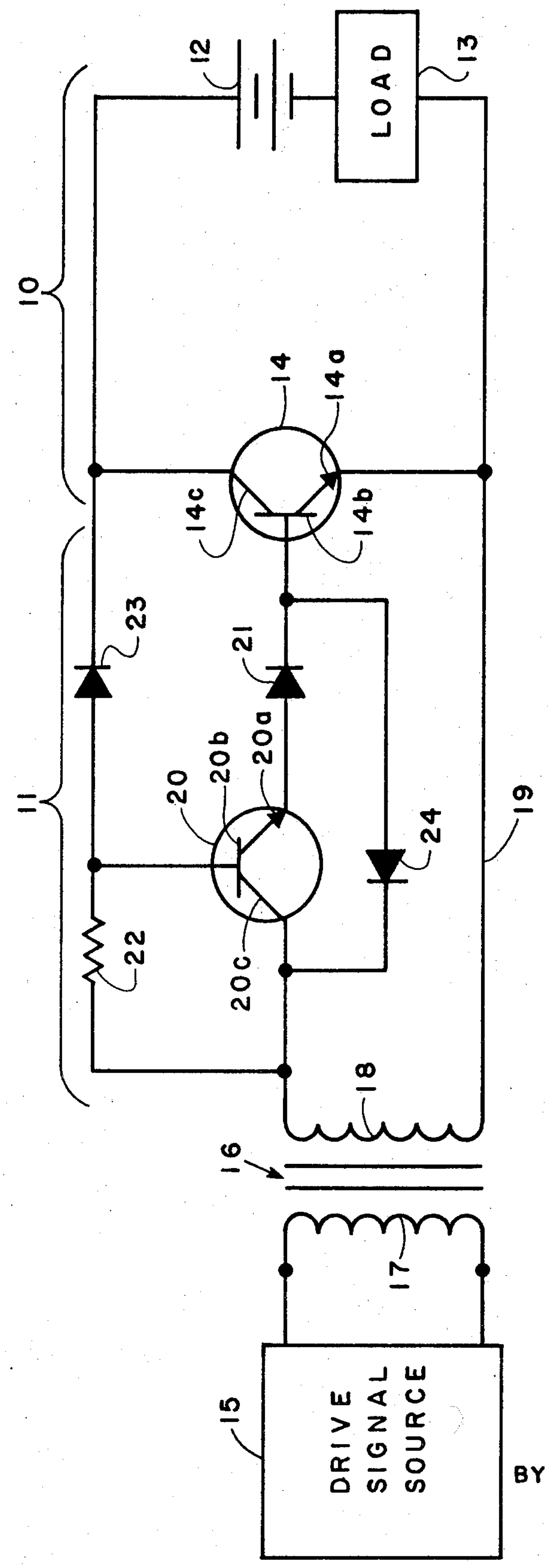
INVENTOR
RICHARD J. RAVAS
BY Hmc Coy
Norman T. Musial
ATTORNEYS

TRANSISTOR DRIVE REGULATOR

ORIGIN OF THE INVENTION

The invention described herein was made in the performance of work under a NASA contract and is subject to the provisions of Section 305 of the National Aeronautics and Space Act of 1958, Public Law 85—568 (72 Stat. 435, 42 U.S.C. 2457).

BACKGROUND OF THE INVENTION

This invention relates to electrical power circuits and is directed more particularly to semiconductor switching circuits as exemplified by DC to AC inverter circuits.

The major requirement for fulfill inverter circuit is that the switching times of the power switching semiconductors coincide as nearly as possible with the switching times of the driving voltage being supplied thereto. To fulfill this requirement the power transistors in inverter circuits must be driven with a high current base drive during turn-on, be strongly reverse biased at turnoff, and be operated slightly below saturation to minimize turnoff delay time. Furthermore, in order to maintain reasonable efficiency at low power output levels, it is necessary for the power dissipation in the driver circuit to be directly proportional to the output current of the inverter.

In some inverter circuits of the prior art, a resistance or other voltage dropping element was connected between the base electrode of each power transistor and its associated drive signal source. Such a circuit configuration fulfills substantially all the requirements for transistor inverter circuits set forth above except that dissipation in the drive circuit is not proportional to the power output current. In order to overcome the lack of direct proportionality between the power output current and the power dissipation of the drive circuit, the prior art in some cases added a positive feedback winding to the drive transformer interposed between the driving source and the power transistor. This scheme is not fully satisfactory, however, because the voltage on the feedback winding adds to the drive voltage. As a result of this additional voltage, the drive transformer may saturate under high output load current conditions causing undesirable distortion of the output wave form. This is particularly true where the drive signal is a variable pulse width voltage.

OBJECTS OF THE INVENTION

Accordingly, it is an object of the invention to provide a high efficiency semiconductor switching circuit having high input signal drive to a switching element which advantageously operates below saturation during its conducting period.

It is another object of the invention to provide a semiconductor switching circuit in which the drive voltage applied to the drive transformer is determined solely by the drive signal source.

Still another object of the invention is to provide a circuit of the above type in which the drive transformer may be of minimum size and yet will not saturate under high output load current conditions.

It is a further object of the invention to provide a semiconductor switching circuit having a drive regulator circuit which maintains power dissipation in the drive circuit at a magnitude directly proportional to the output load current of the inverter without the need for a feedback winding on the drive transformer.

Other objects and advantages of the invention will become apparent from the following description and drawings in which the single FIG. is a schematic diagram of a switching circuit constructed in accordance with the invention.

DESCRIPTION OF A PREFERRED EMBODIMENT

Referring now to the schematic diagram, it will be seen that a switching circuit embodying the invention may include in general a power switching circuit 10 and a drive circuit 11. The power switching circuit 10 may include, by way of example, a DC source 12, a load 13 to be energized, and an NPN type transistor 14 having emitter, base, and collector electrodes 14*a*, 14*b*, and 14*c*, respectively. The DC source 12 and the load 13 are serially connected between the collector electrode 14*c* and the emitter electrode 14*a* of transistor 14, as shown. Each time that the transistor 14 conducts substantially the full voltage of the DC source 12 is applied across the load 13. Consequently, by operating the transistor 14 in a switching mode, voltage pulses of rectangular wave shape are applied to the load 13.

In order to operate the transistor 14 in a switching mode, drive signal such as a square wave or quasi wave voltage, is supplied to the drive circuit 11 from a drive signal source 15 via a drive transformer 16 having a primary winding 17 and a secondary winding 18. The primary winding 17 is connected to the drive signal source to receive a drive signal therefrom. The lower end of the secondary winding 18 of the drive transformer 16, as viewed in the schematic, is connected to the emitter electrode 14*a* of transistor 14 by means of a load 19 while the upper end is connected to a collector electrode 20*c* of an NPN type transistor 20. An emitter electrode 20*a* of the transistor 20 is connected to the base electrode 14*b* of transistor 14 through a voltage dropping means such as diode 21. The diode 21 drops some of the drive voltage applied to the base electrode 14*b* of the transistor 14 and thereby determines the conduction of and the voltage drop across transistor 14 when it is turned on. It will be understood that additional diodes may be connected in series with diode 21 if desired.

As indicated previously, for a switching circuit to operate with high efficiency at low output load current magnitudes, it is necessary that power dissipation in the driving circuit be directly proportional to the load current. Accordingly, the conduction of transistor 20 must be varied to appropriately regulate the drive current. To this end, a voltage dropping means such as resistor 22 is connected between the upper end of the secondary winding 18 of the drive transformer 16 and a base electrode 20*b* of the transistor 20 to serve as bias means for that transistor. A diode 23 which may be termed a drive current diverting means is connected between the base electrode 20*b* of transistor 20 and the collector electrode 14*c* of the transistor 14 serves to direct some drive current away from the base electrode 14*b* of the transistor 14 as the voltage across that transistor drops when it turns on. This diversion of base current advantageously serves to prevent the transistor 14 from saturating so that it can be rapidly turned off.

For the purpose of further decreasing turnoff time of the transistor 14 at the end of its conducting period, a diode 24 is connected between the base electrode 14*b* of the transistor 14 and the collector electrode 20*c* of transistor 20 which, as shown in the schematic, is electrically common with the upper end of the secondary winding 18 of the drive transformer 16. The diode 24 establishes a path whereby a strong reverse bias is applied to the transistor 14 when the polarity of voltage on the secondary winding 18 is such as to render the transistor 14 nonconducting.

Assuming now that the drive signal source has just reversed polarity and that the upper end of the secondary winding 18 of the drive transformer 16 is positive with respect to its lower end, a positive potential will be applied to the base electrode 20*b* of the transistor 20 through the resistor 22. This forward biases the transistor 20 to such an extent that it could pass several times the magnitude of drive current available from the secondary winding 18. This high conduction capability of the transistor 20 causes rapid turn-on of the transistor 14 because all available drive current from the drive current source is directed to the transistor 14. With the transistor 20 conducting, current flows from the upper end of the secondary winding 18 through the collector-emitter path of the transistor 20, the diode 21, the base-emitter path of the transistor 14 and then through the lead 19 to the lower end of the secondary winding 18 causing transistor 14 to conduct.

When the transistor 14 switches from a nonconducting condition to a conducting state as just described, the voltage between the collector electrode 14c and the emitter electrode 14a drops to a low level so that substantially all of the voltage of the DC source 12 appears across the load 13. As the conduction of the transistor 14 increases and the voltage across it decreases, some drive current is diverted away from the collector-emitter path of the transistor 20 flowing from the collector 20c through the base electrode 20b, and then through the diode 23 which serves as a drive current diverting means. From the diode the diverted current flows through the collector emitter path of the transistor 14. By this diversion of a portion of the drive current away from the base electrode 14b of the transistor 14, the transistor is prevented from saturating so that it will turn off rapidly when the voltage on the secondary winding 18 reverses.

When the voltage of the drive signal source reverses polarity causing the upper end of the secondary winding 18 to become more negative than the lower end, the transistor 20 ceases conducting because of the negative bias applied to its base electrode 20b through the resistor 22. This terminates the drive current being supplied to the base electrode 14b of the transistor 14 so that transistor 14 will begin to turnoff. The turnoff time is advantageously shortened by the diode 24 which enables a strong reverse bias to be applied to the transistor 14. When the drive signal source again switches, the on-off conduction cycle of the transistor 14 will be repeated.

It will be understood that the foregoing circuitry may be changed or modified without departing from the spirit and scope of the invention as set forth in the claims appended hereto. For example, PNP type transistors may be substituted for the NPN types utilized in the circuitry of the invention.

We claim:

1. In a drive circuit for regulating the drive current being supplied from a drive signal source to a current switching device having first and second power electrodes and a control electrode, a DC source and a load being serially connected between said first and second electrodes, in combination:

- variable conducting means connected between said drive signal source and said control electrode of said switching device to regulate said drive current;
- bias means connected operatively to said variable conducting means and in signal receiving relationship to said drive signal source to render said variable conducting means conducting when said drive signal is of a first polarity;
- drive current diverting means connected between said variable conducting means and said second power electrode of said switching device to direct a portion of said drive current through said power electrodes of said switching device whereby said switching device is prevented from saturating;
- a transformer having a primary winding connected to said drive signal source and a secondary winding connected to said drive circuit;
- voltage dropping means connected between said variable conducting means and said control electrode of said switching element; and
- a unidirectional current conducting device connecting between said secondary winding of said transformer and said control electrode of said switching device, said unidirectional current conducting device being poled to allow current flow in a direction away from said control electrode of said switching means.

2. The drive circuit set forth in claim 1 wherein said variable conducting means is a transistor having a collector electrode connected to one end of said secondary winding of said transformer an emitter electrode connected to said control electrode of said switching device and a base electrode connected to said bias means, said bias means comprising a resistor connected between said collector electrode and said base electrode of said transistor, the other end of said secondary winding being connected to said first electrode of said current switching device.

3. The circuit of claim 2 wherein said drive current diverting means comprises a unidirectional conducting means connected between said base electrode of said transitor and said second power electrode of said switching device, said unidirectional conducting means being poled to allow current to flow away from said base electrode.

4. The circuit set forth in claim 2 wherein said drive current diverting means comprises a diode connected between said base electrode of said transistor and said second power electrode of said switching device, said diode being poled to pass current from said base electrode to said second power electrode of said switching device.

5. The circuit set forth in claim 4 and including at least a second diode connected between said emitter electrode of said transistor and said control electrode of said switching device, said second diode being poled to pass current in a direction toward said control electrode.

6. The circuit set forth in claim 5 and including a third diode connected between said collector electrode of said transistor and said control electrode of said switching device, said third diode being poled to pass current in a direction away from said control electrode.